US008630164B2

(12) United States Patent
Scholl et al.

(10) Patent No.: US 8,630,164 B2
(45) Date of Patent: Jan. 14, 2014

(54) METHODS AND APPARATUS TO RESPOND TO SIGNALING PROTOCOL FAILURES IN TRAFFIC ENGINEERING TUNNELS

(75) Inventors: Thomas Scholl, Seattle, WA (US); Aswatnarayan Raghuram, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 309 days.

(21) Appl. No.: 12/535,350

(22) Filed: Aug. 4, 2009

(65) Prior Publication Data

US 2011/0032828 A1 Feb. 10, 2011

(51) Int. Cl.
*H04L 12/28* (2006.01)

(52) U.S. Cl.
USPC .............................. 370/218; 370/244; 370/392

(58) Field of Classification Search
USPC ......... 370/216–218, 225, 227, 228, 242, 244, 370/389, 392, 395.3, 395.5, 522
See application file for complete search history.

(56) References Cited

U.S. PATENT DOCUMENTS 7,164,652 B2 * 1/2007 Puppa et al. .................. 370/225
2008/0240121 A1 * 10/2008 Xiong et al. .................. 370/401

OTHER PUBLICATIONS

Cisco, "Release Notes for Cisco IOS XR Software Release 3.5.4," Jan. 15, 2009 (44 pages).
Cisco, "Implementing MPLS Label Distribution Protocol on Cisco IOS XF Software," Dec. 2008 (50 pages).
Cisco, "Release 3.5.4 Software Download," Aug. 11, 2008 (1 page).
Jork et al., "RFC5443—LDP IGP Synchronization," Mar. 2009 (6 pages).
Jork et al., "LDP IGP Synchronization," Jul. 6, 2007 (12 pages).
Huawei Technologies Co., Ltd, "Technical White Paper for MPLS TE Switching Solution," 2007 (10 pages).

* cited by examiner

*Primary Examiner* — Ian N Moore
*Assistant Examiner* — Mon Cheri Davenport
(74) *Attorney, Agent, or Firm* — Hanley, Flight and Zimmerman, LLC

(57) ABSTRACT

Example methods, apparatus and articles of manufacture to respond to signaling protocol failures in traffic engineering (TE) tunnels are disclosed. A disclosed example apparatus includes a database to store a tunnel state for a first TE tunnel, a signaling engine to detect whether a signaling protocol failure associated with the first TE tunnel occurred, and to set the tunnel state to a first logic state when the signaling protocol failure is detected, and a label switching engine to route the data through a multiprotocol label switching (MPLS) based network via a second TE tunnel when the tunnel state is the first logic state, and to route the data through the MPLS-based network via the first TE tunnel when the tunnel state is a second logic state.

12 Claims, 3 Drawing Sheets ent communication services. To reduce packet loss due to inefficient bandwidth utilization and to improve network performance, TE tunnels are defined through the service provider's MPLS-based network to steer traffic along desired paths. Traffic is forwarded along the defined TE tunnels using label switching. Accordingly, each TE tunnel between a particular source or headend router and a particular destination or tail router is assigned a specific label switched path (LSP) within the service provider's network. Typically, the headend router and the tail routers are implemented using provider edge (PE) routers.

DETAILED DESCRIPTION

Example methods, apparatus and articles of manufacture to respond to signaling protocol failures in traffic engineering (TE) tunnels are disclosed. A disclosed example apparatus includes a database to store a tunnel state for a first TE tunnel, a signaling engine to detect whether a signaling protocol failure associated with the first TE tunnel occurred, and to set the tunnel state to a first logic state when the signaling protocol failure is detected, and a label switching engine to route data through a multiprotocol label switching (MPLS) based network via a second TE tunnel when the tunnel state is the first logic state, and to route the data through the MPLS-based network via the first TE tunnel when the tunnel state is a second logic state.

A disclosed example method includes determining during a first time interval a state of a signaling protocol associated with a TE tunnel through an MPLS-based network, and disabling the TE tunnel for transport of data through the MPLS-based network during a second time interval based on the state.

Figure 1:
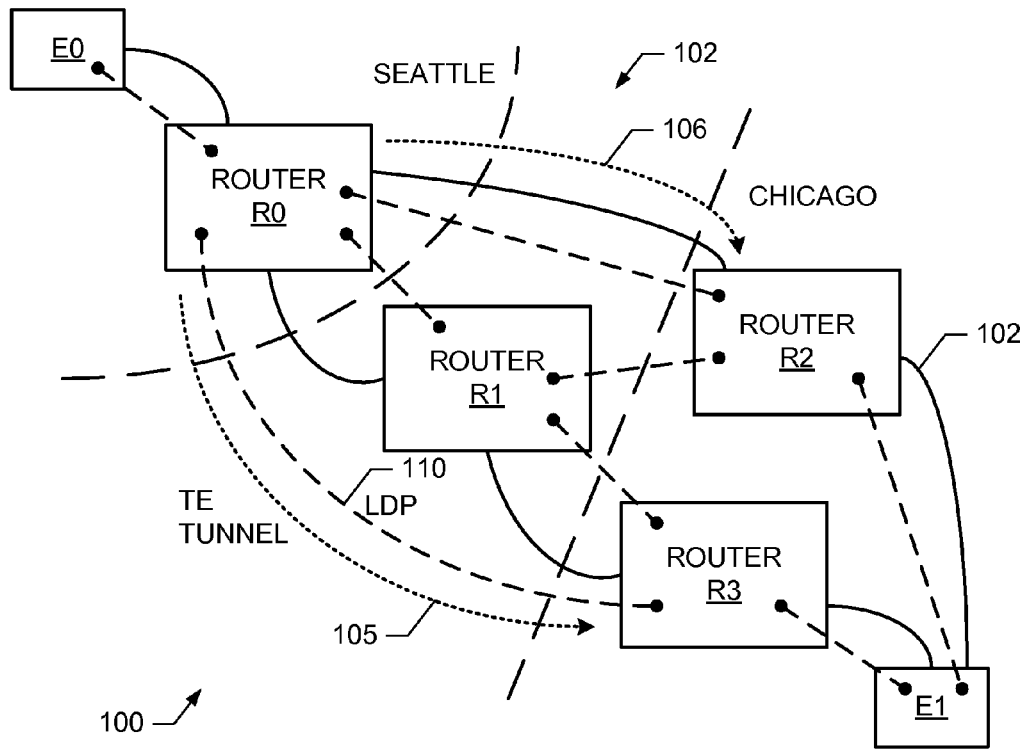
FIG. 1 is a schematic illustration of an example MPLS-based network constructed in accordance with the teachings of this disclosure.

In the interest of brevity and clarity, throughout the following disclosure references will be made to an example MPLS-based network 100 of FIG. 1. However, the methods and apparatus described herein to respond to a signaling protocol failure are applicable to other MPLS-based networks, and/or other networks constructed using any number and/or type(s) of additional and/or alternative network technologies, topologies and/or protocols. To route data between two endpoint routers E0 and E1, the example MPLS-based network 100 of FIG. 1 includes a core 102 having a plurality of core routers, four of which are designated at reference numerals R0, R1, R2 and R3. The example core routers R0-R3 of the example core 102 of FIG. 1 may be communicatively coupled in any topology using any number and/or type(s) of communication paths, one of which is designated at reference numeral 102. In the illustrated example of FIG. 1, communication paths are depicted using solid lines. As illustrated in FIG. 1, the routers R0-R3 may be implemented at different physical locations, thereby allowing the example MPLS-based network 100 to route traffic across and/or within a geographical area and/or region. In the example of FIG. 1, the router R0 is located in Seattle and the routers R2 and R3 are located in Chicago.

Using any number and/or type(s) of method(s), protocol (s), criteria and/or logic, TE tunnels (two of which are designated at reference numerals 105 and 106) are defined and/or established through the core 102 to facilitate the routing of traffic between locations. In some examples, a full-mesh of TE tunnels is defined to allow data to be routed between all pairs of routers E0, E1 and R0-R3. While TE tunnels are generally unidirectional, TE tunnels may, additionally or alternatively, be bidirectional. The example TE tunnels 105 and 106 of FIG. 1 may be used to, among possibly other data, transport data from the endpoint E0 to the endpoint E1.

A TE tunnel defines a data flow between a specific source and a specific destination, which may have associated properties and/or attributes. Example attributes associated with a TE tunnel, in addition to the associated ingress (headend router and/or endpoint) and egress (tailend router and/or endpoint) points, include, but are not limited to, a bandwidth requirement and/or a cost-of-service (CoS) associated with forwarding data along that TE tunnel. In the example of FIG. 1, traffic is forwarded along the path defined by the associated TE tunnel using MPLS label switching. Hence, each TE tunnel is assigned a specific label switched path (LSP) identifier within the network. There is a one-to-one correspondence of MPLS LSPs to TE tunnels. However, TE tunnels are not bound to a specific path through the network. Unless configured explicitly, TE tunnels can reroute packets via any path through the network associated with the MPLS LSP. For example, the TE tunnel 105 routes data between endpoints E0 and E1 via the R0-R1-R3 path.

The LSP identifier for the example TE tunnel 105 may be established using a signaling protocol such as, for example, a resource reservation protocol (RSVP) and/or a label distribution protocol (LDP). For example, an LDP signaling protocol session 110 operates within the associated TE tunnel 105, which traverses the core 102. However, under some circumstances, the LDP session 110 may fail even while the underlying TE tunnel 105 remains eligible for transport of data. Were this to happen, data may be forwarded down a path that results in lost data. As shown in FIG. 1, there may be additional and/or alternative LDP signaling protocol sessions, which are depicted as dashed lines with dot endpoints, between other pairs of the routers E0, E1 and R0-R3.

To mitigate, avoid, reduce, minimize and/or substantially eliminate such data loss, the example headend endpoint E0 of FIG. 1 detects failures, errors and/or losses in the LDP session 110. When an LDP session failure is detected, the example router R0 of FIG. 1 changes and/or configures a tunnel state variable and/or flag associated with the TE tunnel 105 to a first logic state such that data is no longer transported via the TE tunnel 105. While use of the TE tunnel 105 is suspended, data will be rerouted to and/or via another TE tunnel, such as a TE tunnel 106. While and/or when the LDP session 110 is again operating as intended, the tunnel state variable and/or flag for the TE tunnel 105 is set to a second logic state to resume transport of data via the TE tunnel 105. The example router R0 of FIG. 1 can set the tunnel state variable and/or flag by, for example, sending an appropriate command to the router R3. Example commands include, but are not limited to, an "autoroute announce" or an "igp-shortcut" command. In some examples, the setting of the tunnel state variable and/or flag to the first logic state does not inactivate and/or terminate the TE tunnel 105 but only suspends use of the TE tunnel 105. Any of the routers R0-R3 and/or the endpoints E0 and E1 can likewise detect signaling protocol session failures and automatically disable the associated TE tunnel(s) associated with the signaling protocol session failure(s). However, it is not necessary that all endpoints and/or routers E0, E1 and R0-R3 of the MPLS-based network 100 perform signaling protocol monitoring and/or TE tunnel disabling. To the extent that not all of the endpoints and/or routers E0, E1 and R0-R3 implement the methods and/or apparatus disclosed herein to respond to signaling protocol failures, only a portion of the data transported by the example MPLS-based network 100 will be protected from loss due to signaling protocol failures.

Figure 2:
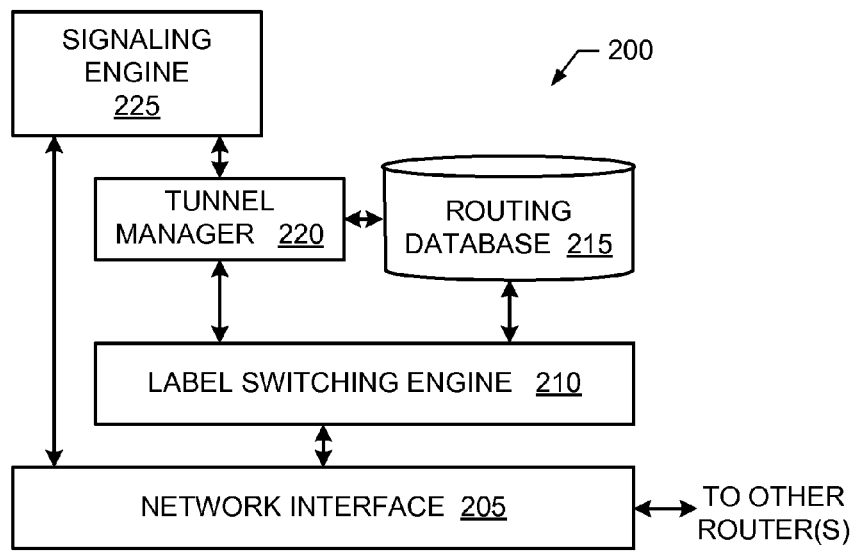
FIG. 2 illustrates an example manner of implementing any of the example routers of FIG. 1.

FIG. 2 illustrates an example manner of implementing any of the example routers E0, E1 and R0-R3 of FIG. 1. While any of the example routers E0, E1 and R0-R3 may be implemented using the example device of FIG. 2, for ease of discussion, the device of FIG. 2 will be referred to as router 200. To communicatively couple the router 200 to other routers, the example router 200 of FIG. 2 includes any type(s) and/or number of network interfaces, one of which is designated at reference numeral 205. An example network interface 205 is implemented in accordance with any past, present and/or future standard, recommendation and/or specification for Ethernet transceivers.

To route data, the example router 200 of FIG. 2 includes any number and/or type(s) of label switching engines, one of which is designated at reference numeral 210. Using any number and/or type(s) of method(s), logic, algorithm(s) and/or rule(s), the example label switching engine 210 routes received data based on labels associated with the received data and based on a routing database 215. The example routing database 215 of FIG. 2 may be implemented using any number and/or type(s) of data structures, and may be stored on any number and/or type(s) of memory(-ies) and/or memory device(s).

To establish and/or manage TE tunnels, the example router 200 of FIG. 2 includes any number and/or type(s) of tunnel managers, one of which is designated at reference numeral 220. Using any number and/or type(s) of method(s), logic, algorithm(s) and based on any number and/or type(s) of criteria, constraint(s) and/or rule(s), the example tunnel manager 220 of FIG. 2 selects, establishes and/or manages TE tunnels. As TE tunnels are established and/or managed, the example tunnel manager 220 updates the example routing database 215 to represent the preferable path through the core 102 corresponding to each TE tunnel. Collectively, the label switching engine 210 and the tunnel manager 220 work with the other routers of an MPLS TE network to route data based on LSPs and TE tunnels.

To perform signaling, the example router 200 of FIG. 2 includes a signaling engine 225. The example signaling engine 225 of FIG. 2 implements a signaling protocol, such as LDP or RSVP, to establish a LSP for a given TE tunnel 105. To mitigate, avoid, reduce, minimize and/or substantially eliminate data losses, the example signaling engine 225 monitors each LDP session (e.g., the example LDP session 110 of FIG. 1) for failures, errors and/or losses. When an LDP session failure is detected, the example signaling engine 225 changes and/or configures a tunnel state variable and/or flag for the corresponding TE tunnel 105 to a first logic state such that data is no longer transported via the TE tunnel 105. While use of the TE tunnel 105 is suspended, the label switching engine 210 and the tunnel manager 220 will route data via another TE tunnel. While and/or when the LDP session 110 is again operating as intended, the tunnel state variable and/or flag for the TE tunnel 105 is set to a another logic state to re-enable transport of data via the TE tunnel 105. The example signaling engine 225 can set the tunnel state variable and/or flag by, for example, sending an appropriate command to the tunnel manager 220 and/or another router via the network interface 205. Example commands include, but are not limited to, the vendor specific "autoroute announce" and "igp-shortcut" commands.

The example signaling engine 225 of FIG. 2 monitors the state and/or status of the signaling protocol session 110 by periodically and/or a periodically sending a keep-alive message and monitoring for a response. For robustness, the signaling engine 225 may require more than one missed response before determining and/or deciding that a signaling protocol failure has occurred. Likewise, after a signaling protocol failure is detected, the signaling engine 225 may wait to receive more than one correct response before re-enabling the associated TE tunnel for transport of data.

While an example manner of implementing the example routers E0, E1 and R0-R3 of FIG. 1 has been illustrated in FIG. 2, one or more of the interfaces, engines, data structures, elements and/or devices illustrated in FIG. 2 may be combined, divided, re-arranged, omitted, eliminated and/or implemented in any other way. Further, the example network interface 205, the example label switching engine 210, the example routing database 215, the example tunnel manager 220, the example signaling engine 225 and/or, more generally, the example router 200 of FIG. 2 may be implemented by hardware, software, firmware and/or any combination of hardware, software and/or firmware. Thus, for example, any of the example network interface 205, the example label switching engine 210, the example routing database 215, the example tunnel manager 220, the example signaling engine 225 and/or, more generally, the example router 200 may be implemented by one or more circuit(s), programmable processor(s), application specific integrated circuit(s) (ASIC(s)), programmable logic device(s) (PLD(s)) and/or field programmable logic device(s) (FPLD(s)), etc. Further still, the router 200 may include interfaces, engines, data structures, elements and/or devices instead of, or in addition to, those illustrated in FIG. 2 and/or may include more than one of any or all of the illustrated interfaces, engines, data structures, elements and/or devices.

Figure 3:
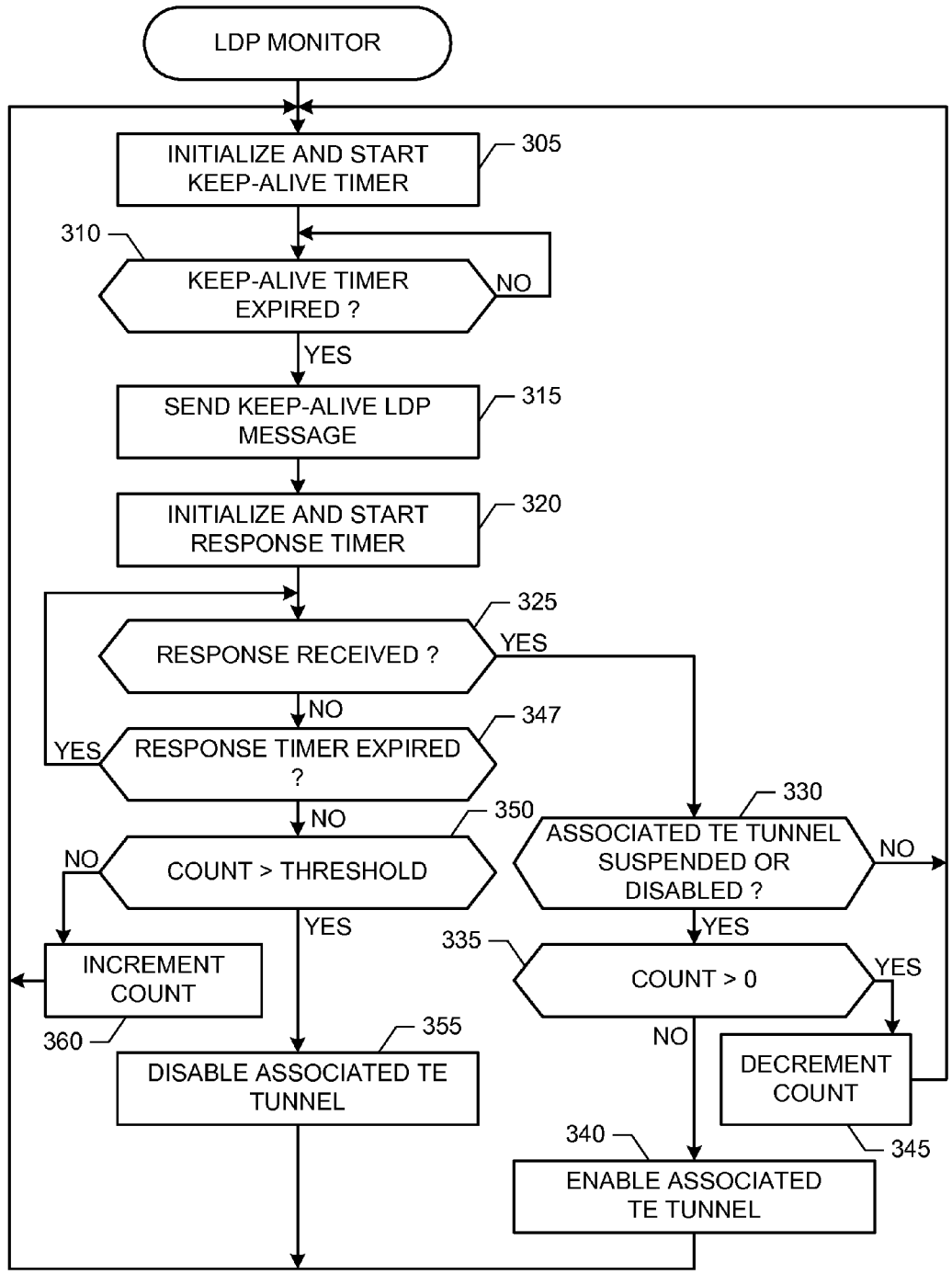
FIG. 3 is a flowchart representative of an example processes that may be carried out to implement the example label distribution protocol (LDP) monitor of FIG. 2 and/or, more generally, any of the example routers of FIGS. 1 and 2.

FIG. 3 is a flowchart representative of an example process that may be carried out to implement the example routers E0, E1, R0-R3 and 200 of FIGS. 1 and/or 2. The example process of FIG. 3 may be carried out by a processor, a controller and/or any other suitable processing device. For example, the example process of FIG. 3 may be embodied in coded instructions stored on any article of manufacture such as, but not limited to, any tangible computer-readable and/or computer-accessible medium. Example tangible computer-readable medium include, but are not limited, to a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be electronically accessed by a processor, a general-purpose or special-purpose computer, or other machine with a processor (e.g., the example processor platform P100 discussed below in connection with FIG. 4). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example process of FIG. 3 may be implemented using any combination(s) of ASIC(s), PLD(s), FPLD(s), discrete logic, hardware, firmware, etc. Also, some or all of the example process of FIG. 3 may instead be implemented manually or as any combination of any of the foregoing techniques, for example, any combination of firmware, software, discrete logic and/or hardware. Further, many other methods of implementing the example operations of FIG. 3 may be employed. For example, the order of execution of the blocks may be changed, and/or one or more of the blocks described may be changed, eliminated, sub-divided, or combined. Additionally, any or all of the example process of FIG. 3 may be carried out sequentially and/or carried out in parallel by, for example, separate processing threads, processors, devices, discrete logic, circuits, etc.

The example process of FIG. 3 begins with the example signaling engine 225 of FIG. 2 initializing and starting a keep-alive timer (block 305). When the keep-alive timer expires (block 310), the signaling engine 225 sends a keep-alive LDP signaling message (block 315), and initializes and starts a response timer (block 320).

If a response to the keep-alive signaling message is received before the response timer expires (block 325), the signaling engine 225 determines whether the corresponding TE tunnel is currently disabled or suspended (block 330). If the associated TE tunnel is not suspended or disabled (block 330), control returns to block 305 to re-initialize and re-start the keep-alive timer.

If the associated TE tunnel is currently suspended (block 330) and a sufficient number of correct responses have been received (block 335), the signaling engine 225 (re-)enables the associated TE tunnel (block 340). The signaling engine 225 (re-)enables the TE tunnel by changing the tunnel state of the TE tunnel to a logic state that represents an enabled tunnel by, for example, sending and/or executing an "autoroute announce" or an "igp-shortcut" command. Control then returns to block 305 to re-initialize and re-start the keep-alive timer.

Returning to block 335, if an insufficient number of correct responses have been received (block 335), a count of the number of correct responses still needed is decremented (block 345), and control returns to block 305 to re-initialize and re-start the keep-alive timer.

Returning to block 325, if a response is not received (block 325), the signaling engine 225 determines whether the response timer has expired (block 347). If the response timer has not expired (block 347), control returns to block 325 to check for a response.

If the response timer has expired (block 347), the signaling engine 225 determines whether a sufficient number of failed responses has occurred (block 350). If enough failures have occurred (block 350), the signaling engine 225 disables the associated TE tunnel (block 355). The signaling engine 225 disables the TE tunnel by changing the tunnel state of the TE tunnel to a different logic state that represents a disabled tunnel by, for example, sending and/or executing an "autoroute announce" or an "igp-shortcut" command. Control then returns to block 305 to re-initialize and re-start the keep-alive timer.

Returning to block 350, if an insufficient number of failed response has occurred (block 350), a count of the number of failed responses is incremented (block 360), and control returns to block 305 to re-initialize and re-start the keep-alive timer.

In the illustrated example of FIG. 3, the number of failed responses needed before disabling the associated TE tunnel is the same as the number of correct responses required before re-enabling the associated TE tunnel. Alternatively, these numbers may be different.

Figure 4:
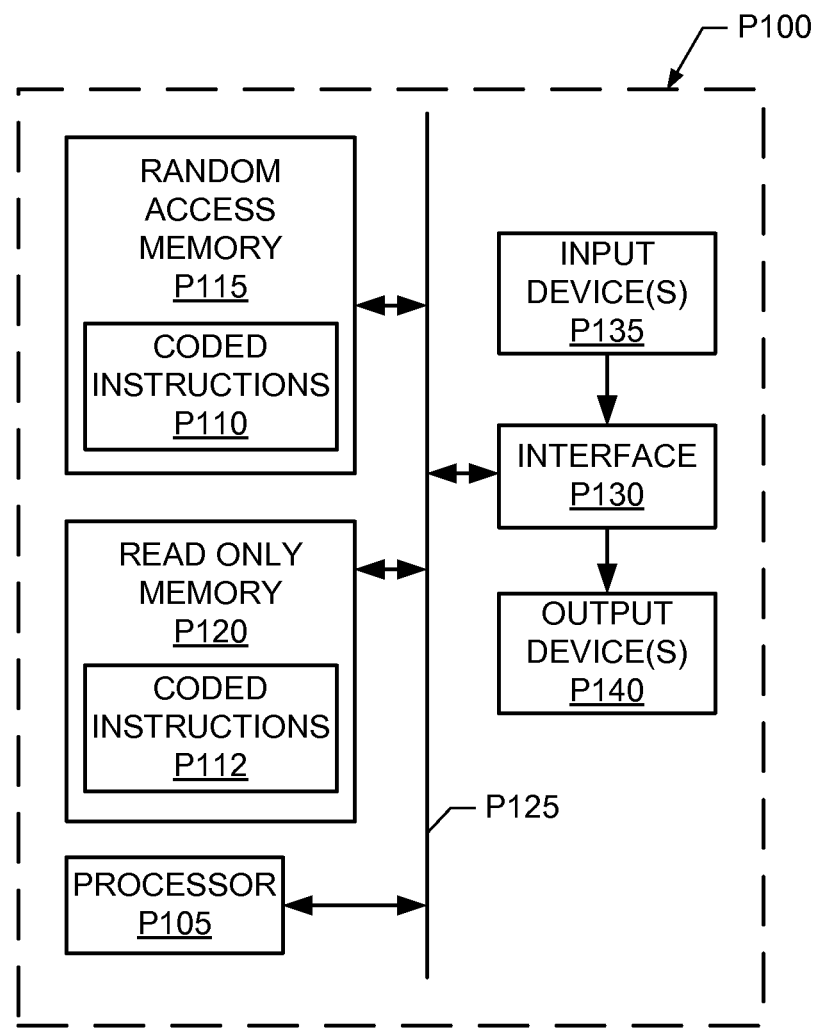
FIG. 4 is a schematic illustration of an example processor platform that may be used and/or programmed to carry out the example process of FIG. 1 and/or to implement any of all of the methods and apparatus disclosed herein.

FIG. 4 is a schematic diagram of an example processor platform P100 that may be used and/or programmed to implement the example routers E0, E1, R0-R3 and 200 of FIGS. 1 and/or 2. For example, the processor platform P100 can be implemented by one or more general-purpose processors, processor cores, microcontrollers, etc.

The processor platform P100 of the example of FIG. 4 includes at least one general purpose programmable processor P105. The processor P105 executes coded instructions P110 and/or P112 present in main memory of the processor P105 (e.g., within a RAM P115 and/or a ROM P120). The processor P 105 may be any type of processing unit, such as a processor core, a processor and/or a microcontroller. The processor P105 may execute, among other things, the example process of FIG. 3 to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example routing database 215 of FIG. 2.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 and/or output devices P140 may be used to, for example, implement the network interface 205 of FIG. 2.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
   a database to store a tunnel state for a first traffic engineering tunnel;
   a signaling engine to establish, via a processor, a label switch path identifier for the first traffic engineering tunnel using a signaling protocol session and to detect whether a failure in the signaling protocol session has occurred by analyzing messages exchanged in accordance with the same signaling protocol session that is used to establish the label switch path identifier for the first traffic engineering tunnel, and to change the tunnel state from a first logic state to a second logic state when the failure in the signaling protocol session is detected, wherein the signaling protocol session is a label distribution protocol session; and a label switching engine to route data through a multiprotocol label switching-based network via a second traffic engineering tunnel when the tunnel state is the second logic state, and to route the data through the multiprotocol label switching-based network via the first traffic engineering tunnel when the tunnel state is the first logic state.

2. An apparatus as defined in claim 1, wherein the signaling engine is to set the tunnel state to the first logic state when the failure in the signaling protocol session is not detected.

3. An apparatus as defined in claim 1, wherein the label switching engine is to route the data through the multiprotocol label switching-based network based on the label switch path identifier.

4. An apparatus as defined in claim 1, wherein the signaling engine is to:
   transmit a label distribution protocol packet via the first traffic engineering tunnel; and
   detect the failure in the signaling protocol session when a response to the transmitted label distribution protocol packet is not received.

5. A method comprising:
   establishing a label switch path identifier for a first traffic engineering tunnel using a signaling protocol session, wherein the signaling protocol session is a label distribution protocol session;
   detecting whether a failure in the signaling protocol session has occurred by analyzing messages exchanged in accordance with the same signaling protocol session that is used to establish the label switch path identifier for the traffic engineering tunnel;
   changing a tunnel state from a first logic state to a second logic state when the failure in the signaling protocol session is detected; and
   routing data through a multiprotocol label switching-based network via a second traffic engineering tunnel when the tunnel state is the second logic state and routing the data through the multiprotocol label switching-based network via the first traffic engineering tunnel when the tunnel state is the first logic state.

6. A method as defined in claim 5, the data is routed through the multiprotocol label switching-based network via the second traffic engineering tunnel when the first traffic engineering tunnel is disabled.

7. A method as defined in claim 5, further comprising:
   transporting the data through the network via the first traffic engineering tunnel based on the label switch path identifier.

8. A method as defined in claim 5, further comprising:
   transmitting a label distribution protocol packet via the first traffic engineering tunnel; and
   determining the failure in the signaling protocol session based on whether a response to the transmitted label distribution protocol packet is received.

9. A tangible article of manufacture storing machine-readable instructions that, when executed, cause a machine to at least:
   establish a label switch path identifier for a first traffic engineering tunnel using a signaling protocol session, wherein the signaling protocol session is a label distribution protocol session;
   determine whether a failure in the signaling protocol session occurred by analyzing messages exchanged in accordance with the same signaling protocol session that is used to establish the label switch path identifier for the first traffic engineering tunnel;
   change a tunnel state associated with the first traffic engineering tunnel from a first logic state to a second logic state when the failure in the signaling protocol session is detected;
   route data through a multiprotocol label switching-based network via a second traffic engineering tunnel when the tunnel state is the second logic state; and
   route the data through the multiprotocol label switching-based network via the first traffic engineering tunnel when the tunnel state is the first logic state.

10. An article of manufacture as defined in claim 9, wherein the machine-readable instructions, when executed, cause the machine to set the tunnel state to the first logic state when the failure in the signaling protocol session is not detected.

11. An article of manufacture as defined in claim 9, wherein the machine-readable instructions, when executed, cause the machine to:
   route the data through the multiprotocol label switching-based network based on the label switch path identifier.

12. An article of manufacture as defined in claim 9, wherein the machine-readable instructions, when executed, cause the machine to:
   transmit a label distribution protocol packet via the first traffic engineering tunnel; and
   detect the failure in the signaling protocol session when a response to the transmitted label distribution protocol packet is not received.

* * * * *